(12) United States Patent
Guo

(10) Patent No.: US 11,879,363 B2
(45) Date of Patent: Jan. 23, 2024

(54) COMBINED SYSTEM OF INTERCOOLED RECUPERATIVE GAS TURBINE AND REFRIGERANT COMPOUND BOTTOMING CYCLE

(71) Applicant: Xuanhua Guo, Shandong (CN)

(72) Inventor: Xuanhua Guo, Shandong (CN)

( * ) Notice: Subject to any disclaimer, the term of this patent is extended or adjusted under 35 U.S.C. 154(b) by 0 days.

(21) Appl. No.: 17/199,469

(22) Filed: Mar. 12, 2021

(65) Prior Publication Data

US 2021/0301721 A1   Sep. 30, 2021

(30) Foreign Application Priority Data

Mar. 30, 2020   (CN) .......................... 202010237872.5

(51) Int. Cl.
| | |
|---|---|
| *F02C 3/06* | (2006.01) |
| *F01K 23/10* | (2006.01) |
| *F02C 3/20* | (2006.01) |
| *F02C 7/16* | (2006.01) |
| *F25B 9/06* | (2006.01) |
| *F02C 6/18* | (2006.01) |
| *F01K 25/08* | (2006.01) |
| *F25B 9/00* | (2006.01) |

(52) U.S. Cl.
CPC ................ *F01K 23/10* (2013.01); *F02C 3/06* (2013.01); *F02C 3/205* (2013.01); *F02C 6/18* (2013.01); *F02C 7/16* (2013.01); *F25B 9/06* (2013.01); *F01K 25/08* (2013.01); *F25B 9/008* (2013.01); *Y02E 20/16* (2013.01)

(58) Field of Classification Search
CPC .... F02C 3/06; F02C 3/205; F02C 7/12; F02C 7/143; F02C 7/16; F02C 6/18; F01K 23/10; F01K 25/08; F25B 9/06; F25B 9/008; Y02E 20/16
See application file for complete search history.

(56) References Cited

U.S. PATENT DOCUMENTS

| | | | | |
|---|---|---|---|---|
| 3,668,884 A | * | 6/1972 | Nebgen ................... | F25B 11/02 62/402 |
| 3,796,045 A | * | 3/1974 | Foster-Pegg ............ | F02C 7/143 60/39.83 |
| 5,406,786 A | * | 4/1995 | Scharpf ................... | C01B 13/02 60/39.12 |

(Continued)

*Primary Examiner* — Steven M Sutherland

(57) ABSTRACT

The invention discloses a new type of integrated cycle to compete with the standard gas-steam combined cycle in terms of full load/part load efficiency besides ramp rate, startup time and other off design performance. The topping cycle is intercooled recuperative gas turbine (ICR GT) with multiple intercoolers. The bottoming compound cycles consists of supercritical refrigerant Rankine cycle (RRC) and vapor compression refrigeration cycle (VCRC). The refrigerant can be chosen from various organic and inorganic working fluids. The topping and bottoming cycles are highly coupled and form a new integrated cycle rising to the challenge of incoming renewable energy era when thermal power plants undergo frequent load change and long-term part load operation. This invention also markedly outperforms single intercooler ICR GT bottomed by single pressure subcritical RRC system in terms of efficiency, ramp rate etc., and could be an incredibly competitive solution for stationary power generation and marine propulsion.

3 Claims, 2 Drawing Sheets

(56) References Cited

U.S. PATENT DOCUMENTS

| | | | |
|---|---|---|---|
| 2015/0233296 A1* | 8/2015 | Kraft | F02C 9/52 60/776 |
| 2016/0131032 A1* | 5/2016 | Pomme | F02C 7/143 60/783 |
| 2019/0078513 A1* | 3/2019 | Lear, Jr. | F02C 3/04 |

* cited by examiner

COMBINED SYSTEM OF INTERCOOLED RECUPERATIVE GAS TURBINE AND REFRIGERANT COMPOUND BOTTOMING CYCLE

BACKGROUND OF THE INVENTION

1. Field of the Invention

The invention relates to a combined/integrated system of intercooled recuperative gas turbine as topping cycle and supercritical refrigerant compound bottoming cycle.

2. Description of the Related Art

In 1950s intercooled recuperative gas turbine (ICR GT) was quite common for stationary power plant even marine propulsion but as gas-steam combined cycle evolved since 1960s, ICR GT quickly faded away due to bulky size and lower efficiency because intercooler and recuperator were limited by tubular heat exchange technology as well as absence of a proper bottoming cycle. Although in recently years Rolls Royce WR-21 engine has demonstrated the compactness of plate fin heat exchanger, ICR GT is still lack of a powerful bottoming cycle making full use of topping cycle's waste heat to compete with three-pressure reheated gas-steam combined cycle in terms of design point efficiency. Furthermore, as intermittent renewable energy plays more important roles, the part load efficiency, startup time and ramp rate of thermal power plant have become critical specification while gas-steam combined cycle suffers from severe part load efficiency degradation and slow response during load change. Simple cycle is good at peak shaving but suffers low efficiency. There is also considerable power output degradation for standard simple and gas-steam combined cycles in hot weather when power demand peaks. Rolls Royce WR-21 was also reported dramatical output degradation on tropical oceans.

SUMMARY OF THE INVENTION

In view of the disadvantages in the prior art, this invention provides a combined system of intercooled recuperative gas turbine and supercritical refrigerant compound bottoming cycle to solve the problems that standard combined cycle suffers in part load, startup, ramping and hot weather etc. For the first time, the three-pressure reheat gas-steam combined cycle is successfully challenged in terms of full load efficiency while the other existing systems such as single intercooler ICR GT bottomed by single pressure subcritical RRC cannot achieve the same performance. The waste heat from topping cycle's intercooler and flue gas is completely utilized by bottoming cycle and the latter also provides refrigeration to cope with gas turbine output degradation in hot weather.

This combined system consists of ICR GT and supercritical RRC/VCRC compound cycle. The ICR GT includes compressor, combustor/heater and turbines, as well as multiple intercoolers, main recuperator and cooling air recuperators. The compound bottoming cycle includes refrigerant fluid turbine, refrigerant fluid condenser, pressure pump together with throttle valves (or expanders), refrigerant fluid compressors, refrigerant internal heat exchanger and GT inlet & flue gas path heat exchangers.

The advantageous effects of the invention are as follows:

1. Compared with single intercooler GT, multiple intercoolers are used to reduce more compression work of gas turbine and decrease compressor discharge temperature (CDT) further for a better recuperation effect thus a lower flue gas temperature can be achieved to improve topping cycle's efficiency and power ratio in such a manner that the combined cycle performance as a whole is optimized.

2. In consideration of water's high specific latent heat, steam Rankine cycle is not suitable for ICR GT because flue gas is unable to evaporate all the preheated water from intercoolers where evaporation shall be avoided to achieve sufficient intercooling effect. Without latent heat of evaporation, preheated supercritical refrigerant fluid can be easily heated up above critical temperature by flue gas or even in preheating period, it also provides a better temperature profile match with flue gas than single pressure or even multiple-pressure subcritical refrigerant. Together with multiple intercoolers, supercritical refrigerant fluid maximizes the intercooling effect because when preheated at intercoolers, supercritical fluid could withstand higher compressed air temperature than subcritical fluid so the design pressure ratio of compressor's rear part can be reduced resulting in a lower CDT and consequently better combined efficiency. Unlike geothermal project, the high refrigerant fluid pump power consumption is compensated by higher topping cycle efficiency.

3. With plenty of supercritical refrigerant fluid generated by multiple intercoolers, relative cooler flue gas and increased specific heat around critical point, the refrigerant fluid turbine operates at relative low temperature so that startup time is reduced. Together with the removal of subcritical RRC internal evaporation cycle (natural or forced) and evaporation drum, supercritical RRC's dynamic response during topping cycle ramping is greatly improved by just manipulating refrigerant fluid pumps. The relative low operation temperature and high pressure also suppresses organic fluid decomposition and operation cost gets reduced.

4. The unique merit of ICR GT is stable efficiency at part load ranging from as low as 50% output. Since topping cycle accounts for as high as 90% output of combined system, together with multiple refrigerant fluid turbines configuration, whole power plant can maintain stable efficiency at wide operation range.

5. The supercritical refrigerant Rankine cycle is also cascaded with vapor compression refrigeration cycle providing refrigeration to adjust the temperature of GT inlet air and intercooler coolant, thereby achieving considerable higher output with mild efficiency loss in hot weather and benefiting operation stability when multiple-shaft GT is adopted.

6. With cooling air (CA) recuperation, the coupling between CA temperature and pressure is released so exergy consuming pressure throttling can be avoided and each CA stream gets optimized for temperature before fed to gas turbine.

BRIEF DESCRIPTION OF THE DRAWINGS

In order to illustrate the embodiments of the invention or the technical schemes more clearly in the prior art, the drawings of the embodiments or the prior art will be briefly described below. In all accompanying drawings, similar elements or parts are generally identified by similar reference numerals. In the drawings, each element or part is not necessarily drawn according to actual scale. E.g., The cooling air recuperators are omitted in FIG. 1 and FIG. 2 although they contribute to GT performance considerably.

In the accompanying drawing: 1 refers to ICR GT plus heat exchangers to bottoming cycle, 2 refers to refrigerant-gas heater, 3 refers to refrigerant fluid turbine, 4 refers to condenser, 5 refers to pressure pump, 6 refers to first throttle valve (expander), 7 refers to first compressor, 8 refers to refrigerant internal heat exchanger, 9 refers to inlet air cooler, 10 refers to intercoolers, 11 refers to main recuperator, 12 refers to refrigerant fluid preheater at flue gas path, 13 refers to second throttle valve (expander), 14 refers to second compressor. 15 refers to the second refrigerant turbine and 16 refers to refrigerant recuperator.

DETAILED DESCRIPTION OF THE PREFERRED EMBODIMENT

The embodiments of the technical schemes of the invention will be described in detail with reference to the drawings. The following embodiments are only used to more clearly explain the technical schemes of the invention, and therefore are only used as examples, and cannot be used to limit the protection scope of the invention.

It should be noted that, unless there are specific statement, the technical or scientific terms used in the invention should be in the ordinary meaning understood by those skilled in the art.

Embodiment

Figure 1:
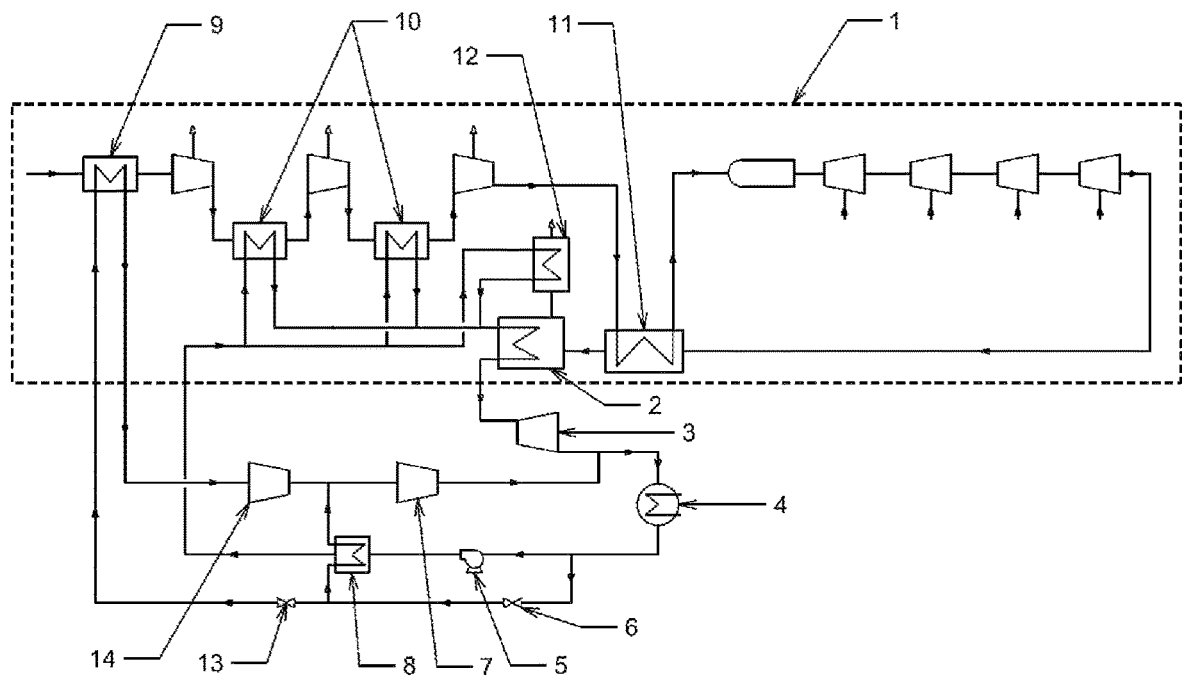
FIG. 1 shows the overall structure of the embodiment 1 of the invention.

As shown in FIG. 1, similar with common GT, the ICR GT also includes compressor, combustor/heater and turbine while distinctively multiple intercoolers 10 are provided to cool the compressed air to reduce more compression work than single intercooler configuration. Multiple intercoolers 10 also lead to lower compressor discharge temperature (CDT) which necessitates recuperation for main compressed air and cooling air because combustion/heat addition and cooling air are the largest two reasons of exergy loss for a gas turbine. After inlet air cooler 9, inlet air passes through several parts of the compressor and releases waste heat to bottoming cycle at multiple intercoolers 10, then flows into main recuperator 11 to heat up before entering combustor/heater. Multiple cooling air (CA) streams are also recuperated by a portion of exhaust gas from turbine, these small CA recuperators shall be arranged properly from case to case although it is beneficial to parallelize these CA recuperators at hot gas path. For plate fin heat exchanger (PFHX), it is quite convenient to accommodate main recuperator and several CA recuperators within one equipment because PFHX is capable of multiple-stream heating. The exhaust gas discharged from turbine first passes though main recuperator 11 & CA recuperators then is directed to refrigerant-gas heater 2 and refrigerant fluid preheater 12 before discharged to ambient air or for recirculation in a closed Brayton cycle. The refrigerant fluid-gas preheater 12 and heater 2 are used to transfer flue gas waste heat to the bottoming supercritical RRC.

For supercritical RRC, the intercoolers 10 and refrigerant fluid preheater 12 are parallel for preheating refrigerant fluid, then the refrigerant-gas heater 2 is used to heat up refrigerant fluid above the critical temperature before delivering the supercritical fluid to turbine 3 where output power is generated. After discharged from turbine 3, the refrigerant fluid gets condensed from gaseous state into liquid state or cooled at condenser 4, then refrigerant fluid is sent to the pressure pump 5 to pressurized above the critical pressure before flowing to intercoolers 10 and refrigerant fluid preheater 12.

For VCRC, the shared condenser 4 with RRC is used to discharge heat to ambient air, refrigeration cycle also comprises the first throttle valve 6, the second throttle valve 13, the first compressor 7, the second compressor 14, inlet air cooler 9 and refrigerant internal exchanger 8. Refrigerant fluid discharged by the condenser 4 passes through the first throttle valve 6 and the second throttle valve 13, becomes cooled two-phase before flowing into the inlet air cooler 9 where GT inlet air density is increased. After absorbing inlet air heat and evaporated, the gaseous refrigerant fluid gets compressed via the first compressor 7 and the second compressor 14 before discharged to condenser 4. To achieve a better cooling effect for the intercooler 10, the embodiment also includes a refrigerant internal heat exchanger 8 where heat of intercooler coolant is absorbed by another refrigerant stream from the first throttle valve 6. In this way the intercooler coolant temperature can be adjusted in hot weather to enhance intercooling effect and avoid unstable operation for multiple-shaft GT.

In the embodiment, the refrigerant fluid adopts R1336mzz (Z), and the refrigerant fluid in the embodiment may also use other organic or inorganic fluids including natural refrigerants such as butane or carbon dioxide (R744).

Figure 2:
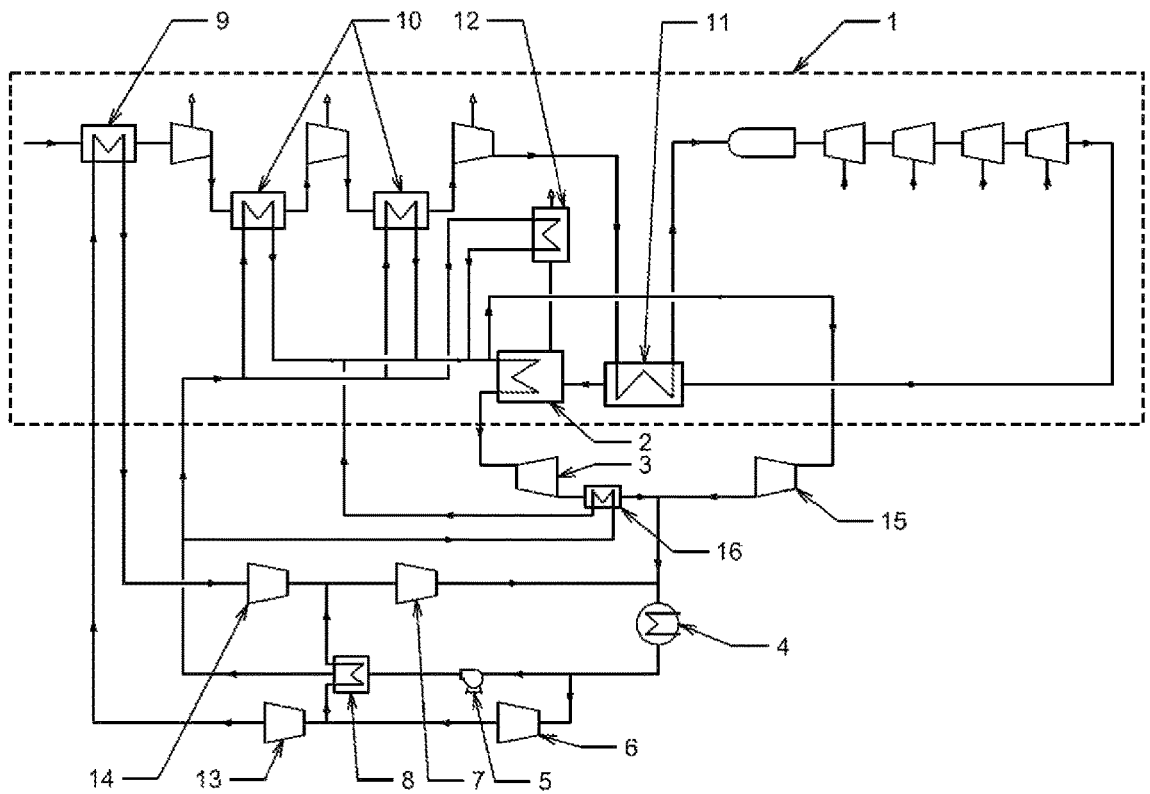
FIG. 2 shows the overall structure of the embodiment 2 of the invention.

In another embodiment as shown in FIG. 2, when low critical temperature and low turbine pressure ratio refrigerant such as carbon dioxide is adopted, a portion of preheated fluid is directed to another refrigerant turbine 15 since intercoolers 10 and refrigerant preheater 12 are capable of preheating refrigerant above the critical temperature, furthermore a refrigerant recuperator 16 can also be supplied to recover waste heat from the discharge of the first turbine 3, which plays the same role of preheating the fluid as the intercoolers 10. When the outlet stream of condenser is supercritical, expanders 6 & 13 can replace throttle valves to generate more power while dense fluid expander is an option for liquid refrigerant from the condenser.

Figure 3:
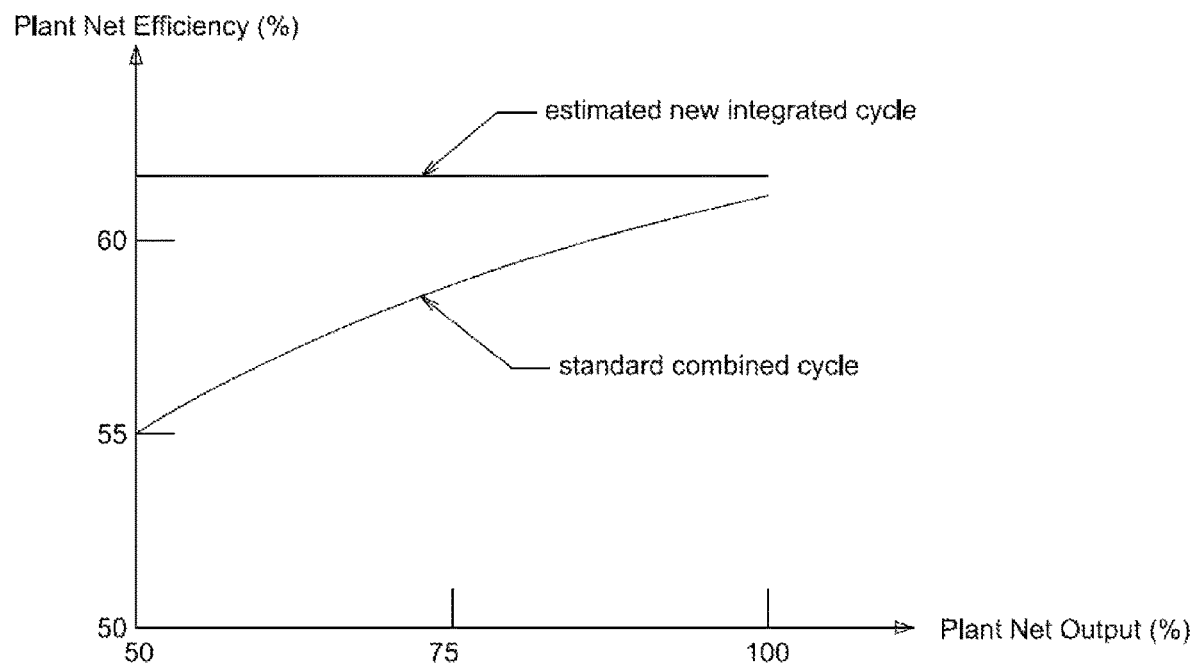
FIG. 3 shows efficiency degradation comparison of standard gas-steam combined cycle versus this novel integrated cycle with the same state-of-the-art technology.

Refer to FIG. 3, the ICR GT has stable efficiency at part load ranging from as low as 50% output. Since topping cycle accounts for as high as 90% output of combined system, together with multiple refrigerant fluid turbines configuration, whole power plant can maintain stable efficiency at wide operation range.

The appearance, quantity and size of the invention can be adjusted according to the size of the place of use, but the internal structure and principle remain unchanged.

It should be noted that: the above embodiments are only used to describe the technical schemes of the invention and the invention is not limited thereto; although the invention is described in detail with reference to the foregoing embodiments, those skilled in the art should understand that they can still modify the technical schemes described in the foregoing embodiments, or equivalently replace some or all of the technical features; and the modifications or replacements should be within the scope of the embodiments of the invention, and all should be included in the scope of protection of the claims and specification in the invention.

What is claimed is:

1. A combined system comprising intercooled recuperative gas turbine (ICR GT) and
   supercritical refrigerant Rankine cycle (RRC)/vapor compression refrigeration cycle (VCRC);
   the ICR GT includes:

a compressor with several compression parts separated by multiple intercoolers (10);

a combustor or heater configured to heat up gas from the compressor with fuel burning or heat transfer;

a turbine with several stages to generate output power;

the multiple intercoolers configured to cool compressed air by refrigerant working fluid;

a main recuperator (11) to heat up the compressed air before entering the combustor or heater; and several cooling air recuperators to heat up cooling air from the compressor before cooling the turbine;

the supercritical RRC includes:

supercritical refrigerant fluid-flue gas heat exchangers (12&2) to preheat and heat up supercritical refrigerant fluid above a critical temperature;

one or several refrigerant fluid turbines (3) to generate output power via refrigerant fluid expansion;

a refrigerant fluid condenser (4) to condense gaseous fluid into liquid state or cool the supercritical refrigerant fluid;

pressure pump (5) to pressurize refrigerant fluid above a critical pressure; and an optional refrigerant recuperator to recover waste heat from a discharge of the one or several refrigerant fluid turbines (3);

the VCRC includes:

gas turbine (GT) inlet air cooler (9) to increase air density;

refrigerant fluid internal heat exchanger (8) to adjust intercooler refrigerant coolant temperature;

throttle valves or expanders (6&13) to reduce refrigerant fluid temperature; and refrigerant fluid compressors (14&7) to pressurize refrigerant steam to the refrigerant fluid condenser (4) shared with the supercritical refrigerant Rankine cycle;

a refrigerant-gas heater (2) receives flue gas from the main recuperator (11) of the intercooled recuperative gas turbine, the refrigerant-gas heater supplies heated fluid to the one or several refrigerant fluid turbines (3), which discharges expanded refrigerant to the refrigerant fluid condenser (4) where the expanded refrigerant is cooled/condensed before being supplied to the pressure pump (5), then the pressure pump (5) pressurize the supercritical refrigerant fluid to the multiple intercoolers (10) and refrigerant fluid preheater (12) for preheating, finally a preheated refrigerant is supplied to the refrigerant-gas heater (2) to be heated above the critical temperature;

the throttle valves or expanders (6&13) receive refrigerant from the refrigerant fluid condenser (4), they also supply cooled refrigerant to the GT inlet air cooler (9) where the cooled refrigerant absorbs the heat of inlet air and gets vaporized; vaporized refrigerant goes through a first of the refrigerant fluid compressors (7) and a second of the refrigerant fluid compressors (14) before arriving to the refrigerant fluid condenser (4); the throttle valve or expanders (6) also supply the cooled refrigerant to a refrigerant internal heat exchanger (8) where a refrigerant coolant to the multiple intercoolers (10) is cooled by vaporizing the cooled refrigerant, vaporized refrigerant is then directed to the first of the refrigerant fluid compressors before being discharged to the refrigerant fluid condenser (4).

2. The combined system as claimed in claim 1, wherein the intercooled recuperative gas turbine (ICR GT) is open Brayton cycle or closed Brayton cycle with ambient air or other gas as working fluid; an external heat source such as concentrating solar energy is applied for heating or preheating the compressed air.

3. The combined system as claimed in claim 1, wherein at least one heat transfer loop is added within the multiple intercoolers (10), using heat transfer fluid to transfer the multiple intercooler's waste heat to the supercritical refrigerant Rankine cycle.

\* \* \* \* \*